United States Patent [19]
Walker et al.

[11] Patent Number: 6,138,106
[45] Date of Patent: Oct. 24, 2000

[54] DYNAMICALLY CHANGING SYSTEM FOR FULFILLING CONCEALED VALUE GIFT CERTIFICATE OBLIGATIONS

[75] Inventors: Jay S. Walker, Ridgefield; Andrew S. Vanluchene, Norwalk; Daniel E. Tedesco; James A. Jorasch, both of Stamford, all of Conn.

[73] Assignee: Walker Asset Management Limited Partnership, Stamford, Conn.

[21] Appl. No.: 08/994,124

[22] Filed: Dec. 19, 1997

Related U.S. Application Data

[63] Continuation-in-part of application No. 08/858,738, May 19, 1997.

[51] Int. Cl.[7] .................................................. G06F 17/60
[52] U.S. Cl. .............................. 705/14; 705/26; 705/27; 235/381
[58] Field of Search ................................. 705/14, 20, 26, 705/27; 235/378, 380, 381

[56] References Cited

U.S. PATENT DOCUMENTS

| | | | |
|---|---|---|---|
| 4,809,837 | 3/1989 | Hayashi | 194/205 |
| 5,243,174 | 9/1993 | Veeneman et al. | 235/381 |
| 5,513,117 | 4/1996 | Small | 364/479.03 |
| 5,652,421 | 7/1997 | Veeneman et al. | 235/381 |

FOREIGN PATENT DOCUMENTS

| | | |
|---|---|---|
| 63-195769 | 8/1988 | Japan . |
| 2113391 | 4/1990 | Japan . |
| 2113396 | 4/1990 | Japan . |

OTHER PUBLICATIONS

Crain's Detroit Business (MI); "Tight Budgets mean more modest corporate gifts"; p. 16, Oct. 1991.

Zepka; "Business Gifts: Lobster by Mail, Beer A Month"; Record (Northern New Jersey); Section: Lifestyle, p. 103, Dec. 9, 1995.

"MICR–Printing Secu red With Positive Pay Files", Financial Services Report, Jan. 5, 1994, vol. 11; No. 1; p. 7; ISSN: 0894–7260.

TechWeb NetGuide "Last Minute Gift Shopping", Daniel Bubbeo, (http://www.techweb.com/se/techsear . . . ate=cmpview%2Ehts&&publication=All), download date: Oct. 31, 1997.

"NetMall's Member Information—A New Kind of Gift Certificate", American Information Systems, Inc. (http://www.netmall.com/cgi–bin/netmall?629439231), download date: May 13, 1997.

"Travelers Express Gift Certificate Program", Travelers Express Company, Inc., (http://www.travelersexpress.com/giftcert.htm), download date: May 13, 1997.

(List continued on next page.)

Primary Examiner—James P. Trammell
Assistant Examiner—Demetra R. Smith
Attorney, Agent, or Firm—Jeffrey L. Brandt

[57] ABSTRACT

A system and process for redeeming concealed value gift certificates with concealed value products. The gift certificates, purchasable by a buyer, represent a value stored in a database and concealed from the subsequent recipient/redeemer. Gift products are selected by the system operator and similarly stored in a database with their corresponding prices. Upon receipt of a gift certificate identifier, the corresponding value is retrieved from the database, and used to identify a selection of gifts affordable with the certificate. The gifts are then displayed to the redeemer, without revealing either the value of the certificate or the cost of the gifts. As gifts are selected for purchase by the redeemer, the concealed value of the gift certificate is reduced by the cost of the selected gifts, and new sets of affordable gifts are identified and displayed to the redeemer. Gifts may also be 'returned,' and the value added back into the concealed value of the gift certificate. The redeemer can thus select gifts in an interactive, game-type manner.

52 Claims, 13 Drawing Sheets

OTHER PUBLICATIONS

"Welcome to Card Express—We Specialize in Electronic Gift Certificates", CardEx, (http://www.cardex.com), download date: May 13, 1997.

"CyberShop—Ready, Set, SHOP", Cybershop Home, (http://cybershop.com/store/Home.hmx?UID= 30295–311211–24555&CID=), download date: Dec. 3, 1997.

"The CardEx GiftCard", Card Express, Inc., (http://www-.cardex.com/gift.htm), download date: Dec. 3, 1997.

"CyberShop—Purchase Gift Certificates", CyberShop, (http://cybershop.com/store/giftcer1.hmx?UID= 14481%2D320911%2D2255&&CID–&menu=ask), download date: Dec. 4, 1997.

Steve Cole, "Cashing In On Money Orders", National Petroleum News, Dec., 1993 vol. 85; No. 13; p. 18; ISSN: 0149–5267.

Mark Veverka, "Software Firm Helps Retailers Keep Tabs On Gift Certificates", Crain's Chicago Business, Dec. 13, 1993.

| PAYMENT AGREEMENT 42 | BUYER ID 44 | CUSTOMER NAME 46 | CUSTOMER ADDRESS 48 | CUSTOMER CREDIT CARD NUMBER 50 | CUSTOMER E-MAIL 52 |
|---|---|---|---|---|---|
| POST-PAID | 001 | CORPORATION A | 32 RANDY ROAD CITY, USA | 1111-1111-1111-1111 | INFO@CORPORATIONA.COM |
| PRE-PAID | 002 | BILL SMITH | 123 MAIN ST. ANYWHERE, USA | 2222-2222-2222-2222 | BS@AOL.COM |
| PRE-PAID | 003 | ASHLEY COHEN | 4 WAIF WAY TOWN, USA | 3333-3333-3333-3333 | AC@UVVU.COM |

FIG. 3

| ITEM CODE 62 | PRODUCT DESCRIPTOR 64 | ITEM PRICE 66 | INVENTORY COUNT 68 |
|---|---|---|---|
| 0001 | OTTOMAN | $299.92 | 15 |
| 0002 | BRASS APPLES | $45.54 | 30 |
| 0003 | MARZIPAN | $50.05 | 2 |

FIG. 4

| CODE NUMBER 72 | INITIAL CODE VALUE 74 | REMAINING CODE VALUE 76 | EXPIRATION DATE 78 | STATUS 80 | SELLER ID 82 | PRE OR POST PAID 84 | AUTHORIZATION CODE 86 |
|---|---|---|---|---|---|---|---|
| 6C1075112 | $60.00 | $2.31 | 3/27/97 | FILLED | 001 | PRE | 456789-0 |
| 6C1076223 | $40.00 | $0.00 | 4/10/97 | EXPIRED | 253 | POST | N/A |
| 6C1077334 | $100.00 | $52.35 | N/A | PENDING | 003 | POST | N/A |
| 6C1078445 | $75.00 | $75.00 | 5/10/97 | PENDING | 010 | PRE | 1232456-1 |

(rows labeled 70A, 70B, 70C, 70D)

FIG. 5

| ORDER NUMBER 92 | GIFT CERTIFICATE CODE 94 | ITEM CODE 1 96 | ITEM CODE 2 98 | ITEM CODE N 100 | SHIPPING NAME 102 | SHIPPING ADDRESS 104 |
|---|---|---|---|---|---|---|
| 123578 | 6C1075112 | 0001 | 0236 | 0457 | SUSAN GREEN | 121 MEADOW WAY USA |
| 875321 | 6C1076223 | 0221 | 0485 | N/A | JOSEPH RED | 31 RIVER AVE. USA |
| 182735 | 6C1077334 | 1220 | N/A | N/A | DERRICK BROWN | 32 OVERLOOK PL. USA |

FIG. 6

DYNAMICALLY CHANGING SYSTEM FOR FULFILLING CONCEALED VALUE GIFT CERTIFICATE OBLIGATIONS

This application is a continuation-in-part of U.S. application Ser. No. 08/858,738, filed May 19, 1997, titled: SYSTEM AND PROCESS FOR ISSUING AND MANAGING FORCED REDEMPTION VOUCHERS HAVING ALIAS ACCOUNT NUMBERS, the entirety of which is incorporated by reference herein.

REFERENCE TO RELATED COPENDING APPLICATIONS

This application is related to co-pending U.S. patent application Ser. No. 08/997,680, filed Dec. 23, 1997, titled: METHOD AND APPARATUS FOR ISSUING AND MANAGING GIFT CERTIFICATES, the entirety of which is incorporated by reference herein.

FIELD OF THE INVENTION

The present invention relates generally to a system for processing gift certificates, and more particularly to a system and process for processing concealed value gift certificates.

BACKGROUND OF THE INVENTION

Gift certificates have become a pervasive and traditional type of gift, with over one third of all gift givers giving such a certificate during the holiday season of 1996. In fact, an estimated eight billion dollars of gift certificates were sold in the United States alone during calendar year 1996.

Despite their pervasive use in the retail environment, gift certificates are often perceived as rather unexciting and uninspired gifts. They typically directly display their value, hence leading to judgments regarding the generosity of the giver. Further, they are often viewed by the recipient as a means by which the giver can avoid spending too much effort in selecting an alternate gift.

The Classic Choices catalog gift program, available through the Internet, provides buyers with the opportunity to purchase a catalog of like-priced gifts. A ten dollar catalog, for example, would include an assortment of ten dollar gifts. The catalog is forwarded to the recipient (without any indication of its value), who may select any gift from within the catalog at no cost.

Classic Choices thus conceals the value of the gifts. It is not, however, a traditional gift certificate, in that its use is limited to a pre-selected group of like-valued products. Further, its flexibility is limited in that it cannot be used for less than or more than (with additional moneys added by the user) its true value, as is the case with traditional gift certificates.

U.S. Pat. No. 4,809,837 to Hayashi teaches a gift certificate system wherein a gift certificate having maximum and minimum values is usable with a vending machine. The maximum and minimum values appear to be made known to the redeemer through actual printing on the certificate, or by encoding on the certificate such that a reader associated with the vending machine reads and displays the values directly or by identifying the number of goods that can be purchased with the certificate. The minimum value functions to prevent too much change from being dispensed by the machine for underutilized certificates. The system permits the redeemer to add value to the redemption value of the gift certificate through the deposit of coins, and to select multiple items having a total cost within the specified minimum and maximum values.

The Hayashi system suffers from the disadvantage of requiring the recipient to do a substantial amount of calculations in utilizing the gift certificate. In redeeming the certificate, the recipient must be aware of both the minimum and maximum values, and carefully select amongst products of known value to stay within those limits. The recipient is thus quite aware of the value of the certificate. Further, the available products are limited to those that can be maintained within a vending machine, and which permit the certificate to be used within its value limits, or with some coinage-type funds added by and/or returned to the redeemer.

A system that would make the redemption of a gift certificate more exciting to the recipient would have the significant advantage of increasing the perceived value of the certificate. Such a system would desirably minimize the recipient's focus on the value of the certificate, and make the redemption process both more flexible and enjoyable. This would not only result in increased satisfaction to both the buyer and recipient, but could also increase the net use of gift certificates in the retail environment, a benefit to retailers.

SUMMARY OF THE INVENTION

An object of the present invention is to provide a system for processing gift certificates whereby the redemption of a gift certificate is a dynamic, interactive, and flexible process for the redeemer.

Another object of the invention is to provide such a the redemption process for processing gift certificates such that the redemption of the certificate is completed without the exact value of the certificate being known to the redeemer.

These and other objects of the invention are accomplished by providing a system and method for processing concealed value gift certificates which enables the recipient to select from amongst a plurality of identified gifts, also of concealed value, such that the resulting value of the selected gifts is within the value of the certificate.

In accordance with one embodiment of the present invention, there is provided a method and apparatus for dynamically displaying products for purchase, the apparatus including: a processor, and a memory connected to the processor. In this embodiment, the memory stores a plurality of product codes for identifying products, and a plurality of product prices, each of the product prices corresponding to one of the product codes. The processor is operative to determine an initial credit value, and to select from the plurality of product codes, using the product prices, a first subset of product codes identifying products that can be purchased with the initial credit value. The processor receives data identifying a first product code from the first subset of product codes. The processor is further operative to reduce the initial credit value by the product price corresponding to the first product code to provide an adjusted credit value, and to select from the plurality of product codes, using the product prices, a second subset of product codes identifying products that can be purchased with the adjusted credit value.

In another embodiment of the present invention, there is provided a method and apparatus for processing a gift certificate having a concealed value, the apparatus including a processor, and a memory connected to the processor. In this embodiment, the memory stores a plurality of product codes for identifying products, and a plurality of product prices, each of the product prices corresponding to one of the product codes. The processor is operative to determine an initial value at least equal to the concealed value of the gift certificate, and to select from the plurality of product prices a first subset of product prices equal to or less than the initial value. The processor is further operative to select from the plurality of product codes a first subset of product codes corresponding to the first subset of product prices, and to receive data identifying a first product code from the first subset of product codes. The processor further operates to reduce the initial value by the product price of the first product code to provide a first adjusted value, select from the plurality of product prices a second subset of product prices of equal or less value than the first adjusted value, and select from the plurality of product codes a second subset of product codes corresponding to the second subset of product prices.

BRIEF DESCRIPTION OF THE DRAWINGS

These and other objects, features and advantages of the invention will become apparent from a reading of the detailed description of the invention, in which:

FIG. 3 is a chart illustrating the contents of the buyer database of FIG. 2;

FIG. 4 is a chart illustrating the contents of the product database of FIG. 2;

FIG. 5 is a chart illustrating the contents of the gift certificate code database of FIG. 2;

FIG. 6 is a chart illustrating the contents of the order database of FIG. 2;

DETAILED DESCRIPTION OF THE INVENTION

System Configuration

As will be seen below, the present invention provides a system and method for generating concealed value gift certificates, and for redeeming such certificates in an interactive process with the redeemer. The redemption process includes providing a display of products/gifts, also having concealed prices, which are selectable by the redeemer. As different products are selected by the redeemer, the concealed value of the gift certificate is adjusted, and the displayed products are likewise reselected so that only those which are still affordable at the adjusted value are displayed. As used herein with respect to values of merchandise and gift certificates, the term "concealed" means the use of reasonable efforts to prevent the actual monetary value of the products and certificates from becoming known to the recipient and redeemer of the gift certificate.

Figure 1:
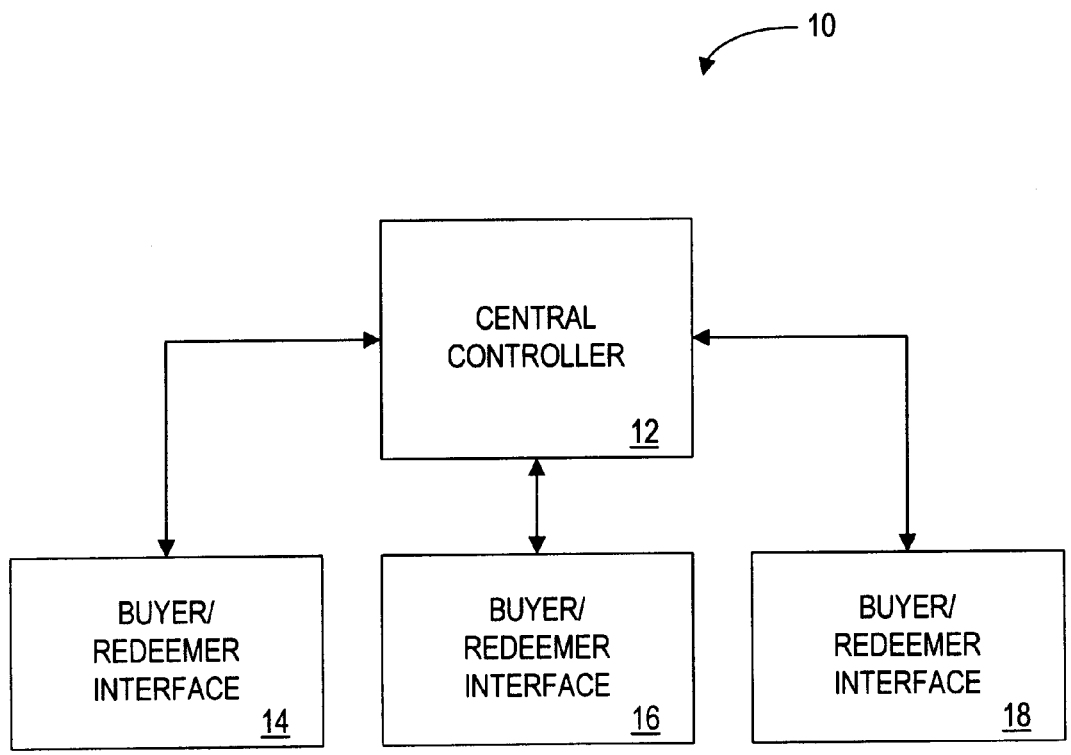
FIG. 1 is a block diagram showing a system for processing gift certificates in accordance with the present invention.

Referring now to FIG. 1, a system 10 is shown to include a central controller 12 in communication with three buyer/redeemer interfaces 14, 16, 18. Central controller 12, described in detail below, contains appropriate data and process control for both issuing and redeeming gift certificates in accordance with the present invention.

In the described embodiment of the invention, buyer/redeemer interfaces 14, 16, 18 each comprise a conventional personal computer having a video display, a user input device such as a keyboard, and a communication link to central controller 12 via the Internet. While three such buyer/redeemer interfaces have been shown, any number may be used. As will be seen from the further description below, buyer/redeemer interfaces 14, 16, 18 provide a human-usable interface to central controller 12, through which gift certificates may be both purchased and redeemed. Separate interfaces may be identified as dedicated to a specific purchasing or redemption function.

The requirements for a buyer/redeemer interface suitable for use with the present invention include a means for communicating product/gift data to a buyer and/or redeemer, preferably including a video display, and a means such as a keyboard or touch-screen for receiving information back from the user. Alternative buyer/redeemer interfaces include: a kiosk having an interactive graphical display, an interactive, on-demand video/television system, and an interactive graphical display as might be found on a vending machine or other human-operated machine.

Figure 2:
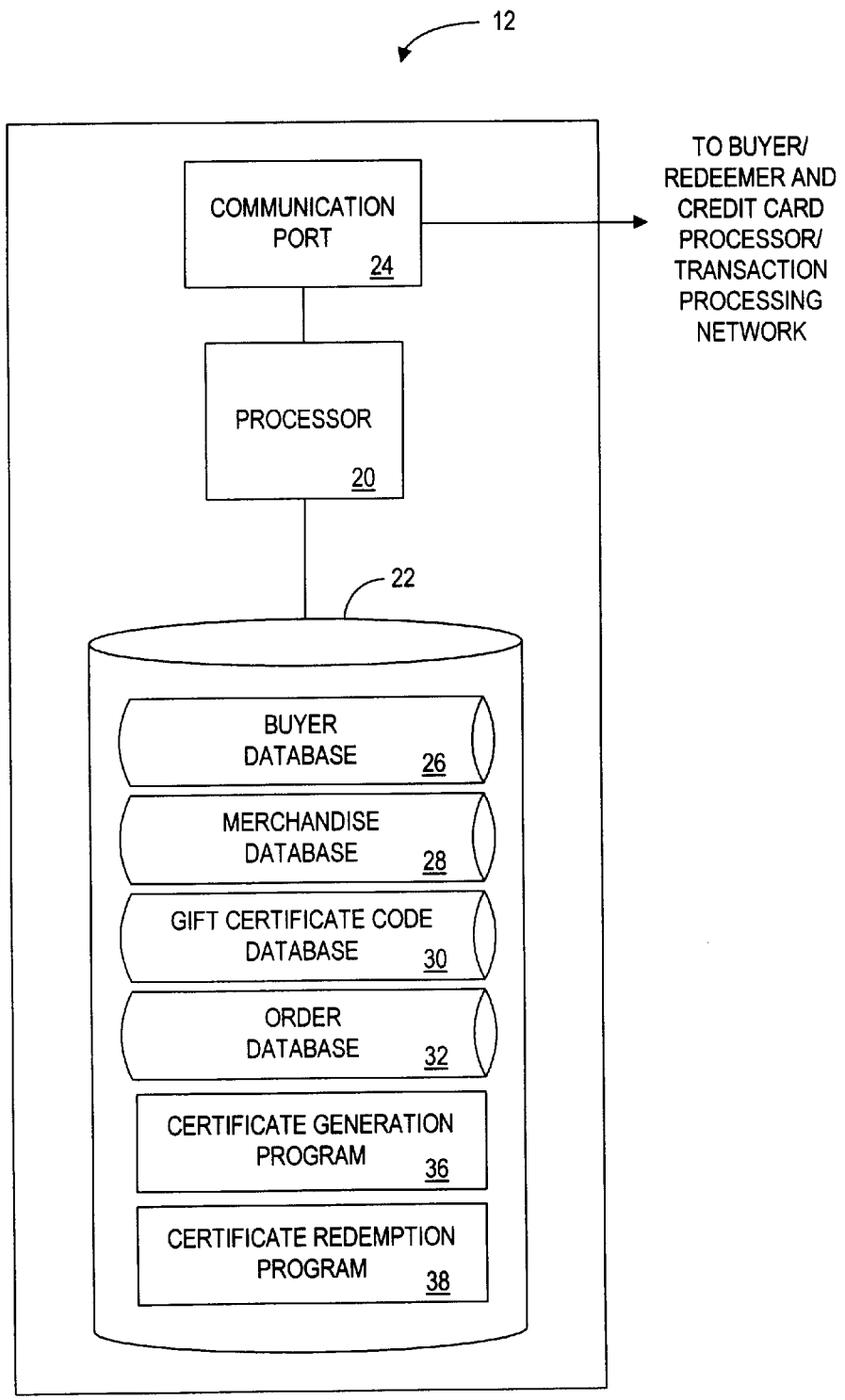
FIG. 2 is a block diagram of the gift certificate central controller of FIG. 1.

With reference now to FIG. 2, central controller 12 is seen to include a central processing unit (CPU) 20 connected to a storage device 22 and to buyer/redeemer interfaces 14, 16, 18 through a communications port 24. In the preferred embodiment, communications port 24 is connected to the buyer/redeemer interfaces via the Internet. In alternate embodiments, this connection can be made through a data network other than the Internet, a dedicated data communications line, a radio frequency communications system, or any other appropriate data communications medium. Communications port 24 further includes, in a manner well known in the art, a conventional connection to a credit card transaction processing network.

Storage device 22 is seen to store four databases: a buyer database 26, a merchandise database 28, a gift certificate code database 30, and an order database 32. Storage device 22 is further seen to store two control programs: a certificate generation program 36 and a certificate redemption program 38. These databases and control programs are described in further detail below.

Central controller 12 can comprise any appropriate computer system, for example an IBM-compatible computer system operating with an Intel Pentium®-class CPU and a Microsoft Windows® operating system. Storage device 22 includes an appropriate combination of magnetic, optical, and semiconductor memory in a manner well-known in the art. A typical storage device might include, for example, a large-capacity magnetic disc memory for storing data, and high-speed semiconductor random access memory (RAM) and read-only memory (ROM) for operating directly with CPU 20.

Database Configuration

Referring now to FIG. 3, a chart showing the contents of buyer database 26 is seen to include three records, indicated at 40A, 40B, and 40C. Buyer database 26 contains data identifying the buyers of gift certificates. Each record 40A–C is seen to include six data fields: a payment agreement field 42, a buyer identifier field 44, a customer name field 46, a customer address field 48, a customer credit card number field 50, and a customer e-mail field 52. Payment agreement field 42 indicates whether a gift certificate purchased by a buyer is pre-paid, or to be paid post the use of the certificate. A credit card may be used in both instances, with the card number stored in field 50 being debited at purchase for a pre-paid certificate, and debited after use for a post-paid certificate.

Buyer identifier field 44 includes an index number assigned to the buyer at the time an account is established, in the manner described below. Customer name, address, and e-mail fields 46, 48, and 52, respectively, include further identifying information relating to the gift certificate buyer.

With reference now to FIG. 4, product database 28 is seen to include three records 60A, 60B, 60C, each including four data fields: an item code field 62, a product descriptor field 64, an item price field 66, and an inventory count field 68. Product database 28 is used to track data relating to items in the gift program.

Item code 62 is an index number assigned by the database manager. Product descriptor 64 includes a written descriptor of the product, while fields 66 and 68 describe the price and the number in inventory, respectively.

Referring now to FIG. 5, gift certificate code database 30 is seen to include four records 70A, 70B, 70C, and 70D. Each record includes eight data fields: a code number field 72, an initial code value field 74, a remaining code value field 76, an expiration date field 78, a status field 80, a seller ID field 82, a pre or post-paid indicator field 84, and an authorization code field 86. Gift certificate code database 30 is used to track data relating to issued gift certificates.

Code number field 72 includes the code number assigned to the gift certificate at the time of issuance. As used herein, the terms "gift certificate," "certificate," "code," and the like are used interchangeably to designate an appropriate means of communicating the code number in field 72, such that the value associated with that code can be identified. Such means would include, but are not limited to, a bare communication of the code such as an electronic transfer of the code, printed documents including the code, machine-readable embodiments of the code, and credit-card type cards including the code.

Continuing to examine the contents of gift certificate code database 30, initial code value field 74 includes the original, or initial cash value of the gift certificate, while remaining code value field 76 includes the adjusted value, i.e. the original value less the price of any purchases made plus the price of any moneys added by the redeemer. The present invention contemplates the addition of funds to the value, for example by the redeemer at the time of redemption. Examples of various adjustments of the gift certificate value are shown herein below.

Expiration date field 78 includes the gift certificate expiration date, if any is specified. Status field 80 defines the status of the gift certificate as: filled/redeemed, pending/unredeemed, or expired. Seller ID field 82 includes a code identifying the seller/issuer of the gift certificate, while pre or post-paid field 84 indicates whether the certificate was pre-paid, or guaranteed through the provision of a credit card account number. Post-paid cards may be guaranteed by the issuer placing a conventional lock against available credit in the credit card account, but not debiting the account before actual redemption of the gift certificate. The lock would be placed upon sale of the gift certificate and receipt of the account number, and would expire in a known manner if, for example, the certificate were to expire unused. As described below, alternate payment arrangements may be practiced for post-paid gift certificates, particularly as they may be purchased in bulk by companies.

Authorization code 86 includes the credit card authorization code obtained by the gift certificate issuer for both pre- and post-paid gift certificates.

Turning now to FIG. 6, order database 32 is seen to include three records, 90A, 90B, 90C, each including seven fields: an order number field 92, a gift certificate code field 94, three item code fields 96, 98, 100, a shipping name field 102 and a shipping address field 104. Order database 32 is used to track data relating to orders of goods by redeemers of gift certificates. Order number 92 is an index number assigned as each record is created. Gift certificate codes 94 correspond to those codes in field 72 of gift certificate code database 30.

The item codes in fields 96, 98, 100 correspond to the item codes in field 62 of product database 28. While three item code fields are shown, more or less may be used to indicated ordered items. Alternatively, a single, variable length field may be used to store multiple item codes.

Completing the description of order database 32, shipping name and address fields 102, 104, respectively, are used to identify the name and address of the recipient of ordered gifts.

System Operation

Figure 7A:
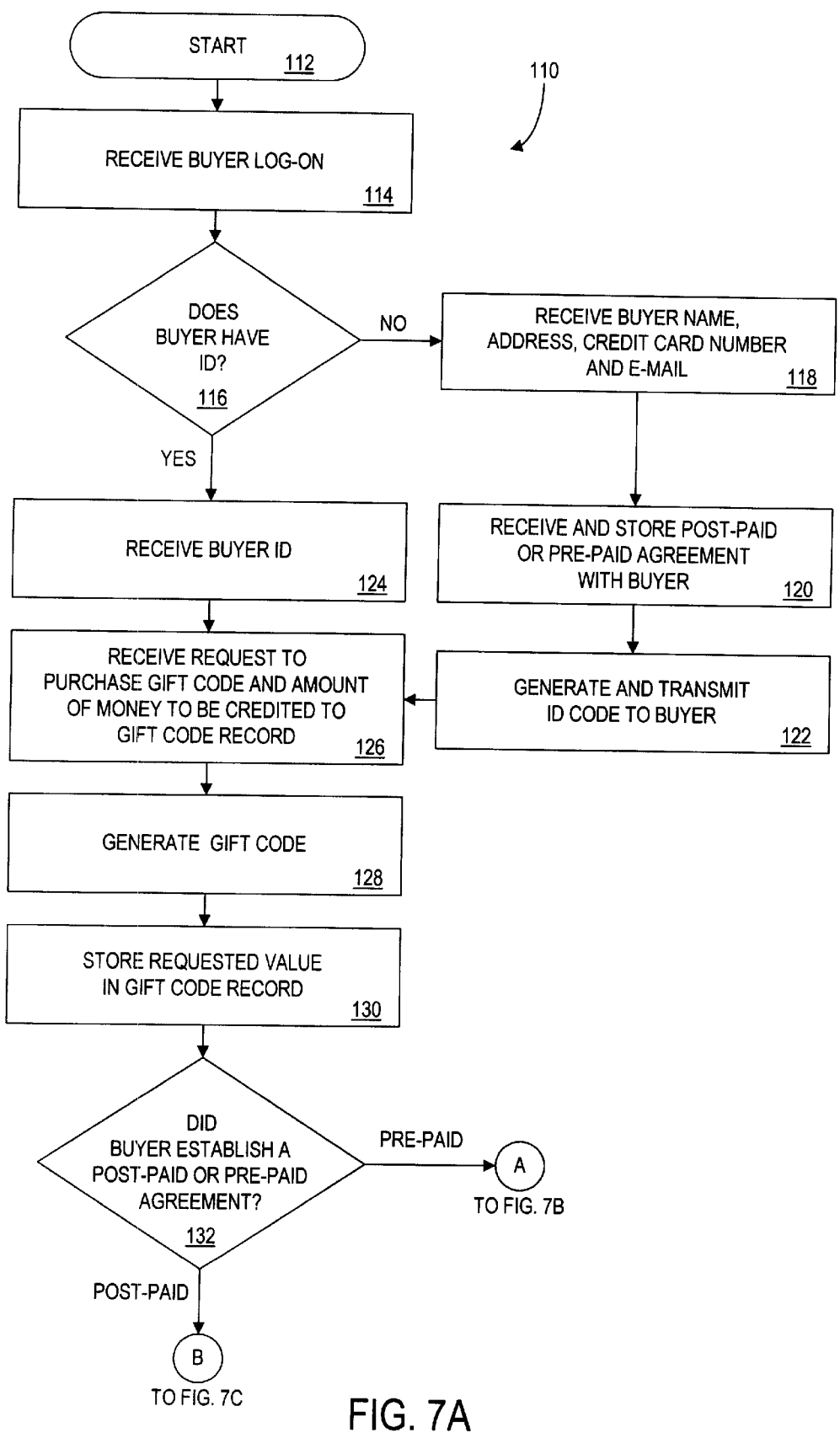
FIGS. 7A–7C together comprise a flow chart showing a method for generating a gift certificate in accordance with the present invention.
Figure 7B:
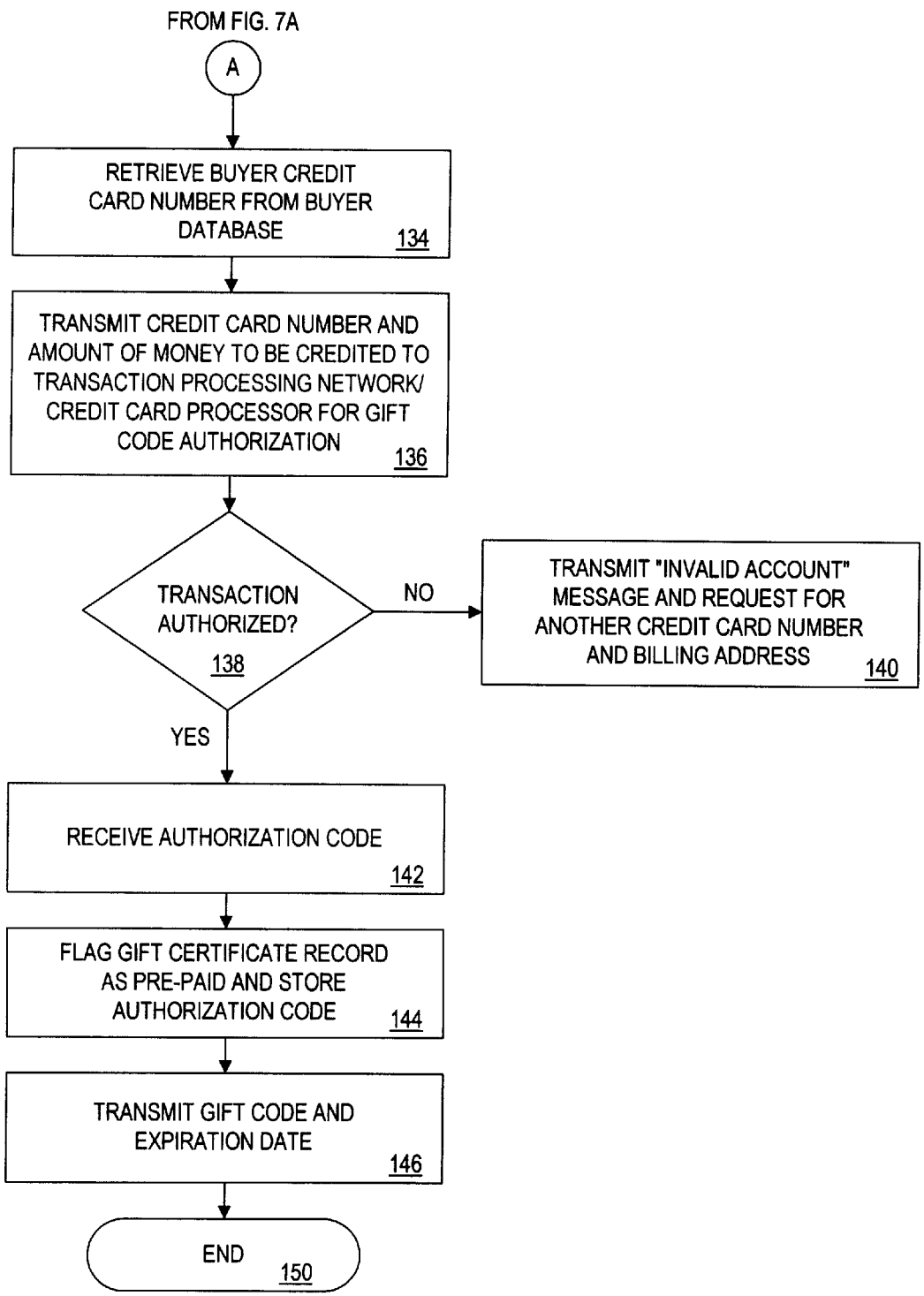
Figure 7C:
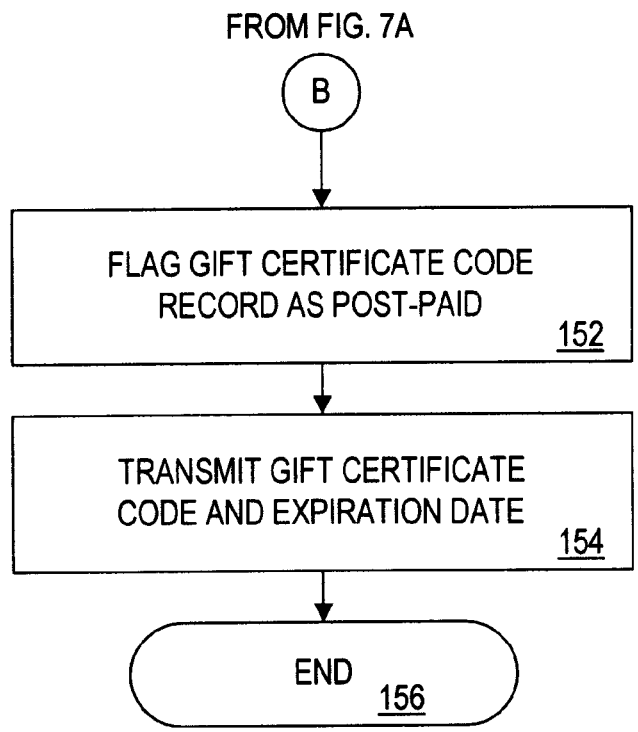

With reference now to FIGS. 7A–C, a process 110 is shown for operating central controller 112 (FIGS. 1 and 2 above) to generate gift certificate codes for use with the present invention. The described embodiment is operable with a buyer/redeemer interface such as those described above. For purposes of description, it will be assumed that the buyer/redeemer is accessing central controller 12 with a personal computer connected via the Internet. It will be further understood that relationships with necessary merchants have been established, and available gift items have been selected and identified by appropriate entries in product database 28.

Upon start of the gift certificate code generation process (step 112), the central controller 12 receives a log-on message from the buyer including the buyer's name and identifier (ID) (if the buyer is not a first time user). Central controller 12 queries buyer database 26 to determine if the buyer ID and/or name indicate the buyer to be a registered user (step 116). If information in a buyer record indicates the buyer to be registered, then the ID is received for processing (step 124).

Alternatively, the system completes a registration process including receiving the buyer's name, address, credit card number, and e-mail address (step 118). In accordance with the present invention, the system provides a choice of a pre-paid or post-paid gift certificate purchase to the buyer, and receives the buyer's selection (step 120). To complete the registration process, a new buyer ID is issued to the buyer (step 122) and a new record is established in buyer database 26, including the appropriate information received during the registration process.

After identifying a registered buyer, central controller 12 receives a request to purchase a gift certificate (step 126) including an indicator of the value of the certificate, preferably in negotiable currency, to be credited to the gift code associated with the certificate. It is noted that communications between central controller 12 and human users at the buyer/redeemer interface are performed using well known graphical interface processes and techniques. Terms such as "send," "receive," "transmit," "communicate," and "provide," as used herein, refer to well known data communications techniques employed amongst Internet users.

A unique gift code is generated by central controller 12 (step 128), and an appropriate record is opened in gift certificate code database 30, including the code, value, expiration date (if any), status, seller ID, and pre or post-paid designator for the particular gift certificate (step 130). In an alternate embodiment of the invention, provisions are made for permitting the buyer to select a personalized code, for example a code including the intended recipient's birth date.

In other alternate embodiments of the invention, methods other than the straight monetary valuation described above are used to establish the redemption value of the gift certificate code. In one implementation, the certificate code varies in value as a function of time, for example increasing or decreasing as a function of time. In another implementation, the certificate code provides incremental values over corresponding increments of time, for example a fixed monetary value per month. In yet another implementation, the gift certificate code may be sold as a future value code, for example a one hundred dollar gift certificate usable only during or after the tenth year following the year of purchase. Such future value codes may be sold at greatly reduced present values. Codes may be sold at a discount, so that the cost of the code to the buyer is less than the value of the code to the redeemer. Further, the central controller 12 may be operated to randomly add value to some gift certificates, thereby increasing both the real and apparent value of the certificate both to the buyer and the redeemer. It will be appreciated that such variations in establishing the value of the gift certificate code enable the buyer to purchase a gift customized for the recipient, while permitting the seller to establish alternative, flexible pricing schemes.

Subsequent processing steps depend on whether the gift certificate is to be prepaid before redemption, or post-paid after its redemption (step 132). Examining first the processing of pre-paid gift certificates, shown in FIG. 7B, the buyer credit card number is retrieved from field 50 of the appropriate record in buyer database 26 (step 134). In a conventional manner, necessary information such as the credit card number and amount of transaction are transmitted to a credit card issuer for authorization (step 136) of the gift certificate value. Such communication is accomplished through a conventional credit card transaction processing network, for example of the type operated by First USA Payment Tech, with an authorization code returned back to central controller 12 and stored in field 86 of gift certificate code database 30 (steps 142, 144).

Alternatively, if the authorization is not received from the issuing bank, an "invalid account" or other appropriate message, and a request for alternate account information, are transmitted by the central controller to the buyer (step 140).

Upon receipt of an authorization code, the generated gift certificate code is transmitted from central controller 12 to the buyer (step 146), and this pre-paid code generation process ends (step 150). Optionally, the gift code may be encrypted, for example using a buyer's public encryption key, before transmission across the Internet from the central controller. In an alternate embodiment, the code is transmitted directly to an identified recipient, either electronically or an in an appropriate hardcopy.

Referring now to FIG. 7C, an alternate process is shown wherein the costs associated with the gift certificate codes are charged to the buyer after the use of the certificate code(s). Such a process is preferably for use with a bulk purchaser of gift certificates, such as a corporation, where credit can be pre-established, default is minimal, and pre-payment is not desirable. In such circumstances, the record in gift certificate code database 30 is flagged in field 84 as "post," (step 152) and the code is transmitted to the buyer (step 154). Preferably, an expiration date is provided so that the account with the buyer can be more easily managed and settled. The process of generating gift certificate codes terminates (step 156), with payment being received from the buyer at a later date. In lieu of receipt of payment, the operator of central controller 12 may select to charge a pre-established credit card, or other credit account number.

In an alternate embodiment of the invention, central controller 12 is operated by a credit card issuer to generate gift certificate codes for inclusion with a credit card billing statement. The codes are mailed to a credit card customer, with a billing statement, in an inactive state. Directions are provided by which a customer can activate the codes, for example by contacting central controller 12 through an interactive telephone unit, or through an Internet or other computer connection, and providing appropriate identification and authorization. The customer may then choose to distribute the activated gift certificate codes to selected recipients.

The credit card issuer may include an appropriate paper certificate, included with the bill mailing or printable through a computer connection to the central controller, by which the customer can provide the code to a recipient in a paper form. An appropriate active/inactive field is included in gift certificate code database 30 whereby the central controller can determine if a code has been activated.

In yet another alternate embodiment of the invention, the value of the gift certificate code may be determined by a telephone call by the buyer to a shared-value telephone line, commonly referred to as a "900number." In lieu of receiving and processing a credit card number, central controller 12 could transmit to the buyer instructions for phoning a specific nine hundred telephone number whereby to pay for the cost of the gift certificate. The buyer would then be billed in a conventional manner by the nine hundred telephone service operator, who would forward appropriate funds to the seller of the gift certificate.

Figure 8A:
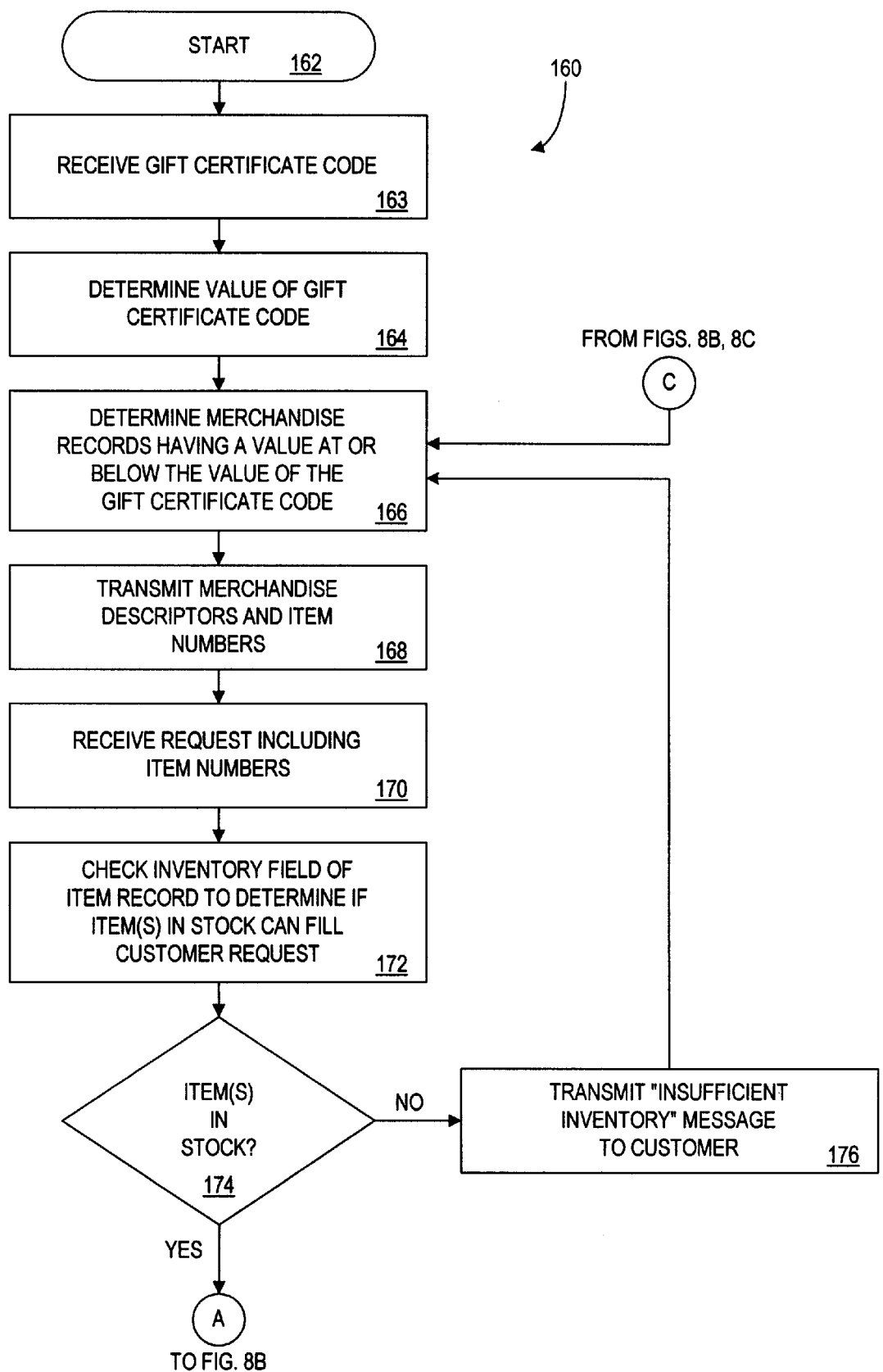
FIGS. 8A–8C together comprise a flow chart showing a method for redeeming a gift certificate in accordance with the present invention.
Figure 8B:
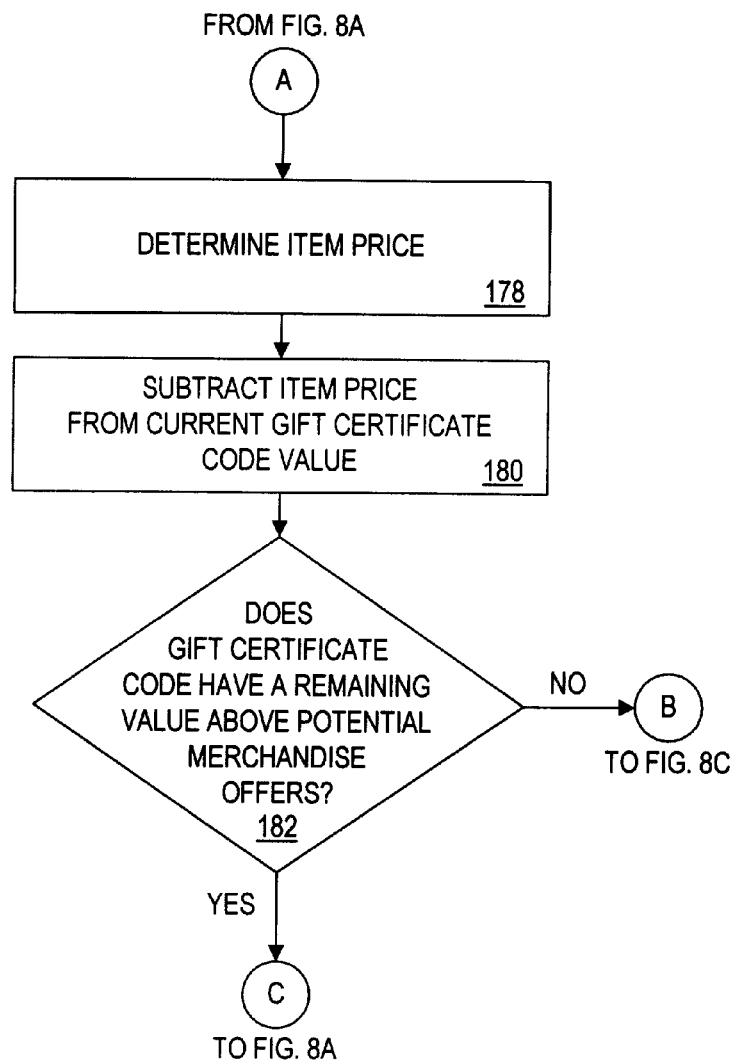
Figure 8C:
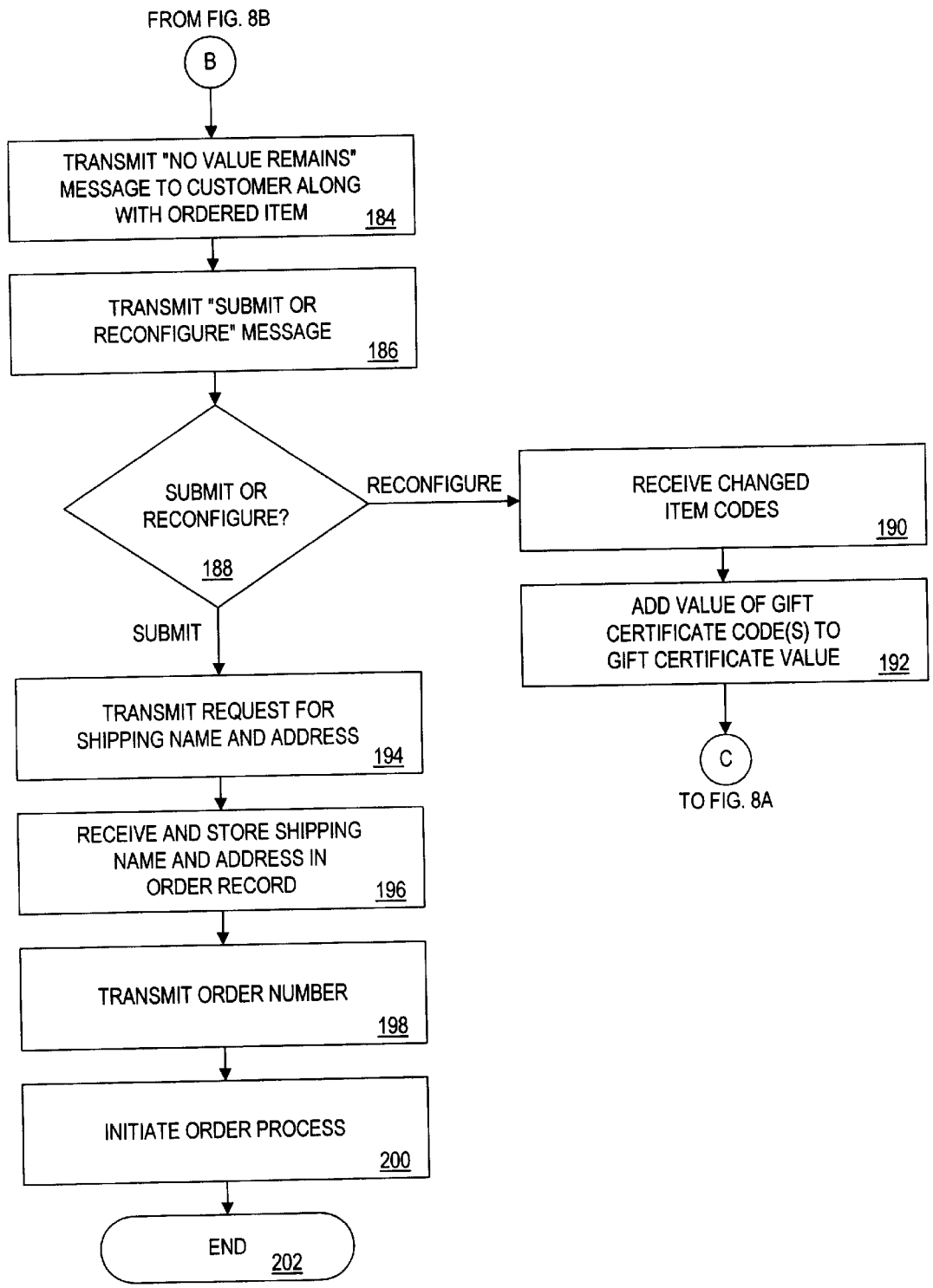

With reference now to FIGS. 8A–C, a process is shown for redeeming gift certificate codes, the process starting (step 162) with central controller 12 receiving a gift certificate code (step 163) via a transmission from a redeemer operating the buyer/redeemer interface 16 via the Internet. As described above, interface 16 (referred to here as a redeemer interface) preferably includes an interactive graphical display.

The gift certificate code is used to reference gift certificate code database 30 to determine the value of the code as set out in initial code value field 74 (step 164). In accordance with the present invention, the value of the gift certificate code is not made available to the redeemer. In fact, in the preferred embodiment, positive steps are taken to conceal the value of the gift certificate code from the redeemer. As described herein, this process makes the redemption of the gift certificate more interesting and exciting to the redeemer.

In an alternate embodiment, a redeemer may submit more than one valid gift certificate code, thereby accumulating a larger initial code value. This could be accomplished within central controller 12 by, for example, canceling as expired all but one of the gift certificate codes, and increasing the initial code value of the remaining gift certificate code to reflect the accumulated value. For post-paid gift certificates, the value of the certificate codes redeemed are tracked and charged appropriately to the various authorized accounts. If the value of the gifts selected upon redemption total less than the post-paid code values, the actual amount spent may be distributed amongst the post-paid accounts, for example in proportion to each account's contribution to the total code value. It will be appreciated that such aggregation of code values further masks the individual value of any one code from the recipient.

Central controller 12 uses the initial code value to interrogate item price field 66 of product database 28, whereby to identify products having a price equal to or less than the value of the gift certificate code (step 166). For example, the value associated with the gift certificate code in record 70A of database 30 is $60. Thus, items 0002 and 0003 in records 60B and 60C, respectively, of database 28 will be identified as 'affordable' with the gift certificate code. As used here, the term "product(s)" includes goods and services, as well as any other items that may be appropriately purchased with a gift certificate.

In an alternate embodiment, discussed in further detail below, central controller 12 provides the redeemer of the gift certificate code with the opportunity to increase its value by, for example, receiving from the redeemer credit card information and a specified 'adjustment' amount. A redeemer may thus choose, for example, to add $25 to the value of a gift certificate. It is noted, however, that the redeemer does not know the value of the gift certificate code, the value being concealed as described above.

Continuing with reference to FIG. 8A, the product descriptors are used to inform the redeemer of products available for purchase with the gift certificate code (step 168). In a preferred embodiment, the descriptors in field 64 of database 28 are used to identify and transmit graphical pictures of the goods themselves for viewing by the redeemer. Alternatively, written or audio descriptions may be transmitted from central controller 12 for consideration by the redeemer.

With reference to the alternate embodiment wherein the redeemer chooses to add additional value to the gift certificate, the effect of such value is communicated by adding the extra value to the initial value identified above, and then repeating steps 164, 166, 168 to identify a different selection of goods. For example, if the redeemer chose to add $250 to the value of the $60 certificate referenced above, item 0001 of record 60A in product database 28 would now be available for his selection. In yet another alternate embodiment, the system can be operated to provide descriptors of more expensive gifts, with an indication of the additional value necessary from the redeemer to afford such gifts. The initial value of the certificate is thus maintained confidential, while the redeemer is educated in the effect that adding to the value of the gift certificate will have.

Continuing with FIG. 8A, the item numbers of the redeemer-selected items are transmitted back to and received by central controller 12 (step 170). The central controller then checks the inventory field 68 of product database 28 for the selected items (step 172) to determine if they are in stock. If the item is not in stock (step 174), an appropriate message is transmitted back to the redeemer (step 176) from the central controller, and the steps of selecting, displaying, and checking gift items (steps 166–174) are repeated for another gift selection.

If at step 174 it is determined that the selected gift item is in stock, then process control continues as described in FIG. 8B, and central controller 12 operates to determine the item price from field 66 of the appropriate record in product database 28 (step 178). This item price is subtracted from the initial code value of the gift certificate (step 180) to provide and adjusted, or remaining code value (as maintained in field 76 of gift certificate code database 30), and the product database is again checked to determine if any items exist that can be purchased with the adjusted code value (step 182).

Assuming that the adjusted code value is sufficient to purchase further gift items, control is transferred back to step 166, whereby another selection of gift items is selected for transmission and display to the redeemer. If the redeemer selects a gift item which is in stock, it is added to the virtual 'basket' of gift items selected by the redeemer, and this loop of the process continues until the adjusted code value is no longer sufficient to purchase another gift.

It will be appreciated that during this entire process, the value of the gift certificate code has been concealed from the redeemer. The gifts that are selected by the central controller have values which are unknown to the redeemer. After each purchase, new gifts are again selected (assuming there is adjusted code value remaining) and again transmitted for display to the redeemer without informing him of the price of these gifts, or the value remaining on the certificate. This concealment of the gift certificate code value is a valuable feature of the invention, shifting the attention of the recipient away from a face value of the gift certificate.

It will be further appreciated that the selection of gifts by the redeemer is, and continues to be as described below, very much an interactive, 'game-like' process. The very process of selecting gifts for purchase provides entertainment value to the redeemer.

Continuing with the description of the process, if it is determined at step 182 that the adjusted code value is insufficient to purchase any remaining gifts, then the process continues by transmitting from central controller 12 to the redeemer an appropriate message indicating that the value of the gift certificate has been used up (step 184). In accordance with another feature of the invention, the redeemer is then given the opportunity to consummate or reconfigure his selection of products (step 188).

Assuming first that the redeemer selects to reconfigure or change his selection of products, he is prompted to transmit to the central controller a list of item codes to be changed. This may be facilitated, for example, by transmitting to the redeemer graphical pictures of the selected products and their item numbers. Items selected to be changed are transmitted from the redeemer back to central controller 12 (step 190), and their value is determined from field 66 of product database 28. The price of changed products are added back into the adjusted code value field 76 of gift certificate code database 30. Optionally, a fee may be charged against the value of the code each time the selection of items is reconfigured by the redeemer. Control of the process then is returned to step 166, whereat a new selection of products is selected for display to the redeemer.

It will thus be appreciated that, not only can the redeemer 'mix and match' the initial selection of gifts, while the central controller conceals the gift certificate value, but he may return selected gifts in favor of new selections, picking and choosing to his own satisfaction. Again, the operation of the invention is seen to be very 'game-like' in nature, and very entertaining to the redeemer.

When the redeemer is ultimately satisfied with his selection of gift items, indicating at step 188 his intention to submit the selection for processing by the central controller, the controller transmits a request for and receives back the shipping name and address for delivery of the selected gifts (steps 194, 196). A conventional order fulfillment process is implemented (step 200), and the process of redeeming the gift certificate is complete (step 202).

In an alternate embodiment of the invention, the buyer may further specify for inclusion in gift certificate code database 30, at the time of purchase of the gift certificate, one or more limited classes or types of gifts to be made available for selection by the redeemer upon redemption of the gift certificate. If, for example, the buyer wishes to purchase a gift certificate for a friend who has recently purchased a new home, he may specify that the use of the certificate be limited to furniture. In the process of selecting gift items available to the redeemer, central controller 12 would limit such items to furniture. Item classes and categories may be readily incorporated into an additional field(s) of product database 28.

It will be appreciated that, unless the value of the product selected by the redeemer matches exactly the value of the gift certificate code, an unlikely situation, there may be small amounts of excess code value, or change. Such small amounts of change may be processed in one of many ways, including for pre-paid accounts: returning the change to the buyer via his credit card account, offering the change to the redeemer of the gift certificate code through a direct refund or some type of appropriate credit, or keeping the change by the gift certificate issuer as part of the price of the certificate to the buyer. If large corporations were to pre-pay for many gift certificates for use by employees, the resulting change from the many certificates may be accumulated by the central controller, and subsequently credited back to the corporate buyer. Where gift certificate codes are post-paid, the system operator may choose to charge only the true price of the selected gift(s) to the buyer, rather than the advertised price of the gift certificate code.

Figure 9:
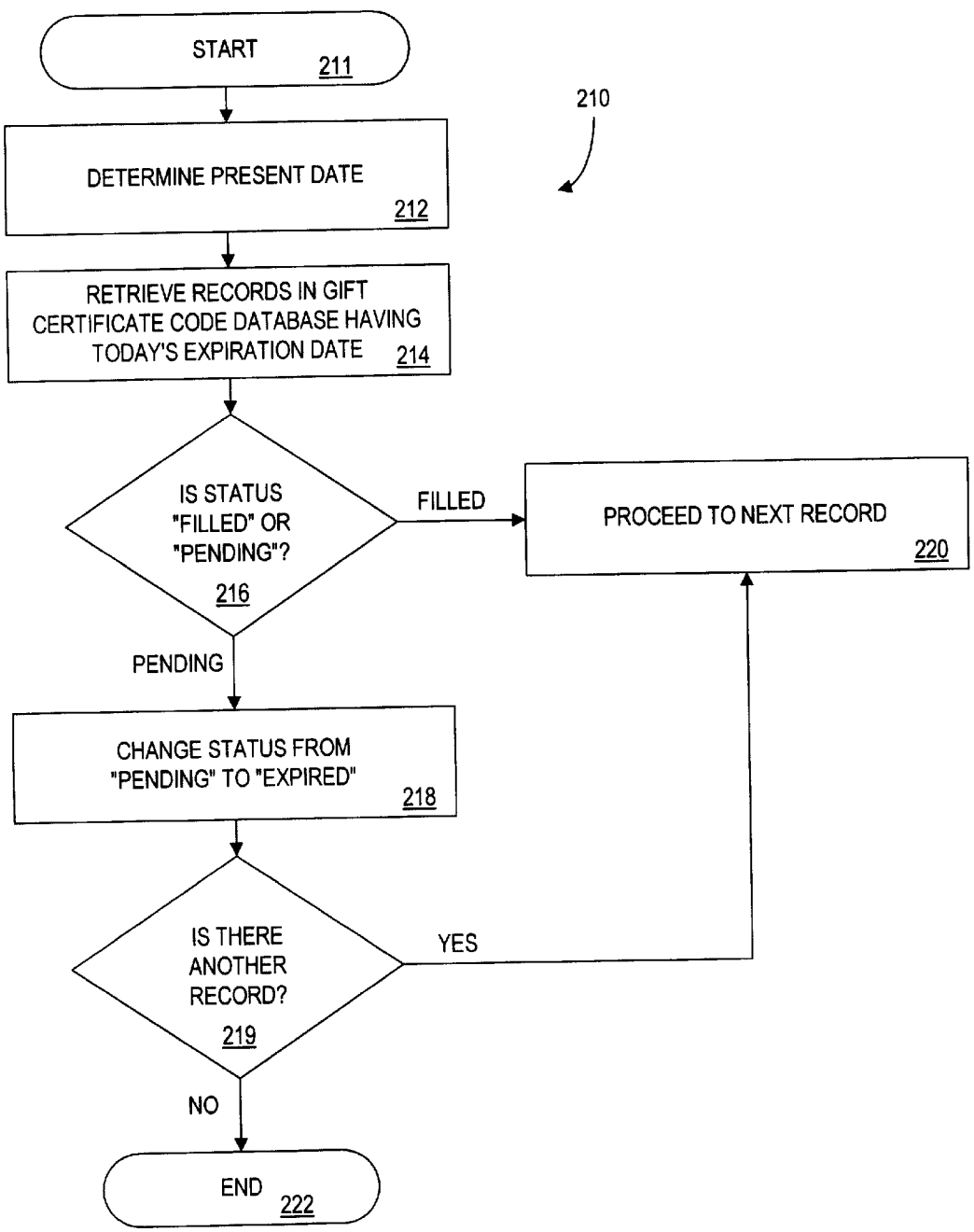
FIG. 9 is a flow chart showing a method for maintaining the gift certificate code database.

With reference now to FIG. 9, a process is shown whereby central controller 12 operates to maintain the currency of gift certificate code database 30. Upon the initiation (step 211) of this process, the central controller determines the present date (step 212), for example using a conventional internal clock. Field 78 of database 30 is then examined to identify records having expiration dates that match, or are earlier than, the current date (step 214). If the status field 80 indicates that the record has been filled, i.e. that the gift certificate code has been redeemed, the record is left unchanged, and the next record is examined (steps 216, 220). If the status indicates the record is pending, i.e. that the gift certificate code has not been redeemed, then the status in field 80 is changed to "expired," indicating that the gift certificate code associated with the record has expired (step 218). If further records exist (step 219), they are in turn processed (step 220). Otherwise, the process ends (step 222).

It will be appreciated that, since the value of the gift certificate code and the value of the gifts remain concealed from and unknown to the redeemer of the certificate, the supplier(s) of the products has great flexibility in setting the price. The supplier can, for example, use a manufacturer's suggested retail price. Alternatively, he can set a discounted price, or vary the prices of the various items to revenue manage available gifts. Such revenue management can be done in real-time, as a function of customer selections. If, for example, a particular gift is not often selected and is accumulating in inventory, the price may be lowered. Since such a price adjustment is not made generally known to the public, it can be made without undercutting the advertised price charged in more traditional retail environments.

While central controller 12 has been described above as an Internet-connected processor, it is not thus limited. Central controller 12 may comprise, for example, a computer control system associated with a vending machine, or an automatic teller machine (ATM) of the type operated by banks and the like. Both vending machines and ATM machines include displays and user-input devices sufficient to the practice of the invention.

While the present invention has been shown and described with respect to particular embodiments, it is not thus limited. Numerous modifications, changes, enhancements and improvements will now occur to those skilled in the art, which fall within the spirit and scope of the invention.

What is claimed is:

1. A system for dynamically displaying products for purchase, comprising:

a processor;

a memory connected to said processor, said memory storing a plurality of product codes for identifying products, and a plurality of product prices, each of said product prices corresponding to one of said product codes;

said processor operative to determine an initial credit value, select from said plurality of product codes, using said product prices, a first subset of product codes identifying products that can be purchased with said initial credit value, receive data identifying a first product code from said first subset of product codes, reduce said initial credit value by the product price corresponding to said first product code to provide an adjusted credit value, and select from said plurality of product codes, using said product prices, a second subset of product codes identifying products that can be purchased with said adjusted credit value.

2. The system of claim 1, said processor further operative to receive data identifying a second product code from said second subset of product codes, and reduce said adjusted credit value by the product price associated with said second product code.

3. The system of claim 1 wherein said step of selecting said first subset of product codes includes the step of selecting from said plurality of product prices a first subset of product prices less than said initial credit value.

4. A method for dynamically displaying products for purchase, comprising the steps of:

storing a plurality of product codes for identifying products;

storing a plurality of product prices, each of said product prices corresponding to one of said product codes;

determining an initial credit value;

selecting from said plurality of product codes, using said product prices, a first subset of product codes identifying products that can be purchased with said initial credit value;

receiving data identifying a first product code from said first subset of product codes;

reducing said initial credit value by the product price corresponding to said first product code to provide an adjusted credit value; and selecting from said plurality of product codes, using said product prices, a second subset of product codes identifying products that can be purchased with said adjusted credit value.

5. The method of claim 4, further including the steps of:

receiving data identifying a second product code from said second subset of product codes; and reducing said adjusted credit value by the product price associated with said second selected product code.

6. The method of claim 4 wherein said step of selecting said first subset of product codes includes the step of selecting from said plurality of product prices a first subset of product prices less than said initial credit value.

7. A system for dynamically displaying products for purchase, comprising:
- means for storing a plurality of product codes for identifying products;
- means for storing a plurality of product prices, each of said product prices corresponding to one of said product codes;
- means for determining an initial credit value;
- means for selecting from said plurality of product codes, using said product prices, a first subset of product codes identifying products that can be purchased with said initial credit value;
- means for receiving data identifying a first product code from said first subset of product codes;
- means for reducing said initial credit value by the product price corresponding to said first product code to provide an adjusted credit value; and
- means for selecting from said plurality of product codes, using said product prices, a second subset of product codes identifying products that can be purchased with said adjusted credit value.

8. An article of manufacture comprising:
a computer-readable medium having computer-readable program code stored thereon for controlling a computer to process the dynamic display of products for purchase, said computer-readable program code including
- program code for storing a plurality of product codes for identifying products;
- program code for storing a plurality of product prices, each of said product prices corresponding to one of said product codes;
- program code for determining an initial credit value;
- program code for selecting from said plurality of product codes, using said product prices, a first subset of product codes identifying products that can be purchased with said initial credit value;
- program code for receiving data identifying a first product code from said first subset of product codes;
- program code for reducing said initial credit value by the product price corresponding to said first product code to provide an adjusted credit value; and
- program code for selecting from said plurality of product codes, using said product prices, a second subset of product codes identifying products that can be purchased with said adjusted credit value.

9. A system for processing a gift certificate having a concealed value, comprising:
- a processor;
- a memory connected to said processor, said memory storing
  - a plurality of product codes for identifying products, and
  - a plurality of product prices, each of said product prices corresponding to one of said product codes;
- said processor operative to
  - determine an initial value at least equal to said concealed value of said gift certificate,
  - select from said plurality of product prices a first subset of product prices equal to or less than said initial value,
  - select from said plurality of product codes a first subset of product codes corresponding to said first subset of product prices,
  - receive data identifying a first product code from said first subset of product codes,
  - reduce said initial value by the product price corresponding to said first product code to provide a first adjusted value,
  - select from said plurality of product prices a second subset of product prices of equal or less value than said first adjusted value, and
  - select from said plurality of product codes a second subset of product codes corresponding to said second subset of product prices.

10. The system of claim 9, said processor further operative to conceal said initial value and said plurality of product prices from a human operator redeeming said gift certificate.

11. The system of claim 10, said processor further operative to conceal said first adjusted value from said human operator.

12. The system of claim 9, said processor step of determining said initial value including determining said initial value from a non-human-readable code.

13. The system of claim 9, said processor step of determining said initial value including:
- said memory storing a plurality of gift certificate codes, and a plurality of gift certificate values, each gift certificate value corresponding to a gift certificate code;
- said processor operative to
  - receive a gift certificate code, and
  - identify an initial gift certificate value corresponding to said gift certificate code.

14. The system of claim 13, said processor further operative to set said initial value equal to said initial gift certificate value.

15. The system of claim 13, said processor further operative to:
- receive an additional value; and
- set said initial value equal to said initial gift certificate value plus said additional value.

16. The system of claim 13, said processor further operative to:
- receive a plurality of gift certificate codes;
- identify a like plurality of initial gift certificate values corresponding to said plurality of gift certificate codes; and
- set said initial value equal at least to the sum of said plurality of initial gift certificate values.

17. The system of claim 16, said processor further operative to:
- receive an additional value; and
- set said initial value equal to said initial gift certificate value plus said additional value.

18. The system of claim 9, said processor further operative to output data identifying the products associated with said first and second subsets of product codes.

19. The system of claim 9, said processor further operative to:
- receive data identifying a second product code from said second subset of product codes, and
- store said first and second product codes.

20. The system of claim 19, said processor further operative to output said first and second product codes.

21. The system of claim 19, said processor further operative to:

receive data indicating the cancellation of one of said first or second product codes; and increase said first adjusted value by the product price corresponding to the canceled product code to provide a second adjusted value.

22. The system of claim 21, said processor further operative to reduce said second adjusted value by a predetermined fee responsive to said operation of receiving data indicating the cancellation of one of said first or second product codes.

23. The system of claim 21, said processor further operative to:

select from said plurality of product codes, using said product prices, a third subset of product codes identifying products that can be purchased with said second adjusted value; and output data identifying the products associated with said third subset of product codes.

24. The system of claim 9, said processor further operative to:

receive at least one rule limiting the product codes to be selected from said plurality of product codes; and select said first and second subsets of product codes in accordance with said at least one rule.

25. The system of claim 9, said processor further operative to receive a date on which said gift certificate becomes redeemable.

26. The system of claim 9, said initial value comprising:

a series of dates; and a series of initial values corresponding to said series of dates.

27. The system of claim 9, said processor further operative to continue performing the steps of selecting product prices, selecting product codes, receiving data identifying product codes and reducing the adjusted value until no product prices exist which are less than the adjusted value.

28. The system of claim 9, said processor contained in and operative to control a vending machine.

29. The system of claim 9, said processor contained within and operative to control the operation of an automatic teller machine (ATM).

30. A method for processing a gift certificate having a concealed value, comprising the steps of:

storing a plurality of product codes for identifying products;

storing a plurality of product prices, each of said product prices corresponding to one of said product codes;

determining an initial value at least equal to said concealed value of said gift certificate;

selecting from said plurality of product prices a first subset of product prices equal to or less than said initial value;

selecting from said plurality of product codes a first subset of product codes corresponding to said first subset of product prices;

receiving data identifying a first product code from said first subset of product codes;

reducing said initial value by the product price of said first product code to provide a first adjusted value;

selecting from said plurality of product prices a second subset of product prices of equal or less value than said first adjusted value; and selecting from said plurality of product codes a second subset of product codes corresponding to said second subset of product prices.

31. The method of claim 30, and further comprising the step of concealing said initial value and said plurality of product prices from a human operator redeeming said gift certificate.

32. The method of claim 31, and further comprising the step of concealing said first adjusted value from said human operator.

33. The method of claim 30, said step of determining said initial value including determining said initial value from a non-human-readable code.

34. The method of claim 30, said step of determining said initial value including:

storing a plurality of gift certificate codes;

storing a plurality of gift certificate values, each gift certificate value corresponding to a gift certificate code;

receiving a gift certificate code; and identifying an initial gift certificate value corresponding to said gift certificate code.

35. The method of claim 34, and further including the step of setting said initial value equal to said initial gift certificate value.

36. The method of claim 34, and further including the steps of:

receiving an additional value; and setting said initial value equal to said initial gift certificate value plus said additional value.

37. The method of claim 34, and further including the steps of:

receiving a plurality of gift certificate codes;

identifying a like plurality of initial gift certificate values corresponding to said plurality of gift certificate codes; and setting said initial value equal at least to the sum of said plurality of initial gift certificate values.

38. The method of claim 37, and further including the steps of:

receiving an additional value; and setting said initial value equal to said initial gift certificate value plus said additional value.

39. The method of claim 30, and further including the step of outputting data identifying the products associated with said first and second subsets of product codes.

40. The method of claim 30, and further including the steps of:

receiving data identifying a second product code from said second subset of product codes, and storing said first and second product codes.

41. The method of claim 40, and further including the step of outputting said first and second product codes.

42. The method of claim 40, and further including the steps of:

receiving data indicating the cancellation of one of said first or second product codes; and increasing said first adjusted value by the product price corresponding to the canceled product code to provide a second adjusted value.

43. The method of claim 42, and further including the step of reducing said second adjusted value by a predetermined fee responsive to said operation of receiving data indicating the cancellation of one of said first or second product codes.

44. The method of claim 42, and further including the steps of:

selecting from said plurality of product codes, using said product prices, a third subset of product codes identifying products that can be purchased with said second adjusted value; and outputting data identifying the products associated with said third subset of product codes.

45. The method of claim 30, and further including the step of:

receiving at least one rule limiting the product codes to be selected from said plurality of product codes; and selecting said first and second subsets of product codes in accordance with said at least one rule.

46. The method of claim 30, and further including the step of receiving a date on which said gift certificate becomes redeemable.

47. The method of claim 30, said initial value comprising:

a series of dates; and a series of initial values corresponding to said series of dates.

48. The method of claim 30, and further including the step of continuing to perform the steps of selecting product prices, selecting product codes, receiving data identifying product codes and decreasing the adjusted value until no product prices exist which are less than the adjusted value.

49. Apparatus for processing a gift certificate having a concealed value, comprising:

means for storing a plurality of product codes for identifying products;

means for storing a plurality of product prices, each of said product prices corresponding to one of said product codes;

means for determining an initial value at least equal to said concealed value of said gift certificate;

means for selecting from said plurality of product prices a first subset of product prices equal to or less than said initial value;

means for selecting from said plurality of product codes a first subset of product codes corresponding to said first subset of product prices;

means for receiving data identifying a first product code from said first subset of product codes;

means for reducing said initial value by the product price of said first product code to provide a first adjusted value;

means for selecting from said plurality of product prices a second subset of product prices of equal or less value than said first adjusted value; and means for selecting from said plurality of product codes a second subset of product codes corresponding to said second subset of product prices.

50. An article of manufacture comprising:

a computer-readable medium having computer-readable program code stored thereon for controlling a computer to process a gift certificate having a concealed value, said computer-readable program code including:

program code for storing a plurality of product codes for identifying products;

program code for storing a plurality of product prices, each of said product prices corresponding to one of said product codes;

program code for determining an initial value at least equal to said concealed value of said gift certificate;

program code for selecting from said plurality of product prices a first subset of product prices equal to or less than said initial value;

program code for selecting from said plurality of product codes a first subset of product codes corresponding to said first subset of product prices;

program code for receiving data identifying a first product code from said first subset of product codes;

program code for reducing said initial value by the product price of said first product code to provide a first adjusted value;

program code for selecting from said plurality of product prices a second subset of product prices of equal or less value than said first adjusted value; and program code for selecting from said plurality of product codes a second subset of product codes corresponding to said second subset of product prices.

51. A method for redeeming a gift certificate having a concealed certificate value, comprising the steps of:

providing said gift certificate for redemption;

receiving a first plurality of product identifiers, each of said first plurality of product identifiers identifying a product having a concealed product price and being purchasable with said gift certificate;

selecting a product identifier from said first plurality of product identifiers to identify a product for purchase with at least a portion of said concealed certificate value and to generate an adjusted concealed certificate value equal to said concealed certificate value less the price of the selected product;

receiving a second plurality of product identifiers, each of said second plurality of product identifiers having a concealed product price associated therewith which is less than said adjusted concealed certificate value; and selecting a product identifier from said second plurality of product identifiers to identify a product for purchase with at least a portion of said adjusted concealed certificate value.

52. The method of claim 51 wherein said steps of receiving said first and second plurality of product identifiers includes viewing said first and second plurality of product identifiers on a video display.

* * * * *